United States Patent [19]

Heismann

[11] Patent Number: 4,966,431

[45] Date of Patent: Oct. 30, 1990

[54] INTEGRATED-OPTIC ENDLESS POLARIZATION TRANSFORMER

[75] Inventor: Fred L. Heismann, Freehold, N.J.

[73] Assignee: AT&T Bell Laboratories, Murray Hill, N.J.

[21] Appl. No.: 392,819

[22] Filed: Aug. 10, 1989

[51] Int. Cl.$^5$ .................................................. G02B 6/14
[52] U.S. Cl. ................................ 350/96.14; 350/96.15
[58] Field of Search ................. 350/96.13, 96.14, 96.15

[56] References Cited

U.S. PATENT DOCUMENTS

| | | | |
|---|---|---|---|
| 4,384,760 | 5/1983 | Alferness | 350/96.14 |
| 4,448,479 | 5/1984 | Alferness | 350/96.14 |
| 4,533,207 | 8/1985 | Alferness | 350/96.14 |
| 4,553,810 | 11/1985 | Alferness et al. | 350/96.14 |
| 4,761,049 | 8/1988 | Burns et al. | 350/96.14 |
| 4,832,431 | 5/1989 | Nolting et al. | 350/96.14 |
| 4,856,094 | 8/1989 | Heidrich et al. | 350/96.13 X |
| 4,898,441 | 2/1990 | Shimizu | 350/96.14 |

OTHER PUBLICATIONS

Electronics Letters, 17th Jul. 1986, vol. 22, No. 15, pp. 772-773, "Endless Polarisation Control in Coherent Optical Communications".
Journal of Lightwave Technology, vol. 6, No. 7, Jul. 1988, pp. 1199-1208, "Endless Polarization Control Systems for Coherent Optics", Noe et al.
Journal of Lightwave Technology, vol. 7, No. 7, Jul. 1989, pp. 1033-1043, "New Endless Polarization Control Method Using Three Fiber Squeezers", Wim H. J. Aarts and Giok-Djan Khoe.
Electronics Letters, 16th Jan. 1986, vol. 22, No. 2, pp. 78-79, "Endlessly Rotatable Fractional-Wave Devices for Single-Mode-Fibre Optics".
Electronics Letters, 26th Mar. 1987, vol. 23, No. 7, pp. 335-336, "Polarisation Transformer on Ti:LiNbO$_3$ with Reset-Free Optical Operation for Heterodyne/Homodyne Receivers".

*Primary Examiner*—John D. Lee
*Attorney, Agent, or Firm*—Gregory C. Ranieri

[57] ABSTRACT

Cascadability and simplicity of design and operation are primary attributes of a novel electrooptic polarization transformer for reset-free endless polarization control that allows general polarization transformations from any arbitrarily varying input and into any arbitrarily varying output polarization by producing adjustment elliptical birefringence of constant total phase retardation in a single-mode waveguide. Here, a particular transformation is obtained by adjusting the azimuth of linear birefringence and the ratio of linear to circular birefringence. In this integrated-optic realization, the endless polarization transformer includes at least one cascadable transformer section comprising a first TE$\longleftrightarrow$TM mode converter followed by a first TE/TM phase shifter followed by a second TE$\longleftrightarrow$TM mode converter and a second TE/TM phase shifter. The sections are formed over a birefringent waveguide capable of supporting propagation of TE and TM optical signal modes.

20 Claims, 2 Drawing Sheets

INTEGRATED-OPTIC ENDLESS POLARIZATION TRANSFORMER

TECHNICAL FIELD

This invention relates to waveguide devices and, more particularly, to devices for performing polarization control.

BACKGROUND OF THE INVENTION

Optical fiber communication systems based on fiber other than polarization preserving fiber cause lightwave signals in the fiber to experience random changes in polarization state from one end of the fiber to the other. Fiber birefringence is the cause of the random polarization changes. Random polarization changes are evidenced as fading or loss of the lightwave signal at the receiver because the polarization of the received signal differs from a prescribed or expected polarization.

In order to correct the polarization state of lightwave signals emerging from the optical fiber and, thereby avoid polarization fading, polarization transformers have been developed to transform the fiber output polarization into the prescribed polarization state for applications such as heterodyne detection and interferometric signal processing. Conventional polarization transformers provide a limited range of birefringence compensation and require a reset cycle when the range is exceeded. Reset cycles give rise to periods of unacceptable data loss. Endless polarization transformers provide continuous control of the polarization state over a virtually infinite range of birefringence compensation.

Endless polarization transformers have been developed using cascaded polarization transformers having a limited transformation range such as fiber squeezers and electrooptic devices using lithium niobate. Fiber squeezers mechanically induce birefringence in the fiber axes to cause retardation between the two orthogonal modes perpendicular and parallel to the direction of pressure. While these cascaded devices permit truly endless (reset free) operation, individual elements within the devices still require occasional reset cycles. Although the reset cycles can be performed without affecting the overall polarization transformation (quasi-endless polarization control), these devices generally fail to permit polarization fluctuations during reset cycles. Moreover, they require sophisticated and even computer controlled drive algorithms for proper operation which, undoubtedly, results in a slow response.

SUMMARY OF THE INVENTION

Cascadability and simplicity of design and operation are primary attributes of a novel electrooptic polarization transformer for reset-free endless polarization control. The polarization transformer performs general polarization transformations from any arbitrarily varying optical input polarization into any arbitrarily varying optical output polarization by producing adjustable elliptical birefringence of constant total phase retardation in a single-mode waveguide. A particular transformation is obtained by adjusting the azimuth of linear birefringence and the ratio of linear to circular birefringence. In its integrated-optic realization, the endless polarization transformer includes at least one cascadable transformer section comprising cascaded first and second TE⟷TM mode converters. Phase shifting (TE/TM) is performed in a section between the mode converters, in a section following the mode converters, or both between and following the mode converters. All sections are formed over a birefringent waveguide capable of supporting propagation of TE and TM optical signal modes.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Figure 1:
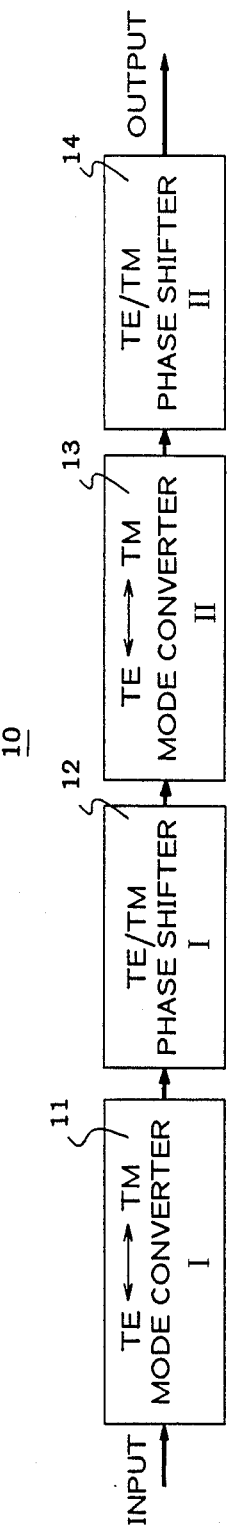
FIG. 1 is a simplified block diagram of an exemplary embodiment of the invention.

Endless polarization transformers are ideally suited for applications in fiberoptic coherent communication systems, where polarization controllers of essentially unlimited (endless) transformation ranges are needed to match the polarization states of the local oscillator laser and the received optical signal. The transformer utilizes the electrooptic effect and can be realized with integrated-optic strip waveguides. It allows general polarization transformations from arbitrarily varying input polarization states into any arbitrary output polarization state, requiring only three independent drive voltages of limited range.

The polarization transformer is based on alternating TE⟷TM mode conversion and TE/TM phase shifting in a birefringent waveguide, such as in $LiNbO_3$ or $LiTaO_3$ devices or Group III-V or II-VI semiconductor devices. An exemplary realization of the polarization converter on x-cut, y-propagation $LiNbO_3$ is shown schematically in FIGS. 2 and 3. For ease of understanding, the device can be viewed as a combination of a wavelength tunable electrooptic polarization transformer and with an electrooptically tunable frequency shifter. As realized, a half-wave plate type of rotation is generated electrooptically by inducing an adjustable combination of TE⟷TM mode conversion and TE/TM phase shifting, and endlessly variable TE/TM input and output phase shifts are obtained by coupling the TE and TM modes at an electrooptically induced traveling index grating.

The electrode structure of the polarization transformer consists of three periodically interleaved electrode systems driven by three independent voltages of the form $$V_C = V_{OC} \sin\gamma \cos\mu, \quad (1a)$$

$$V_S = V_{OS} \sin\gamma \sin\mu, \quad (1b)$$

$$V_P = V_T + V_{O'} \cos\gamma, \quad (1c)$$

where $V_C$ and $V_S$ induce adjustable mode conversion of variable TE/TM output phase and $V_P$ induces pure TE/TM phase shifting. The voltage amplitudes $V_{OC}$ and $V_{OS}$ in (1a and b) are chosen such that $V_C$ induces complete TE→TM(or TM→TE) conversion for $\mu=0$ and $\gamma=\pi/2$ and such that $V_S$ induces complete TE→TM (or TM→TE) conversion for $\mu=\pi/2$ and $\gamma = \pi/2$. $V_O$ is chosen such that, for $\gamma = 0$, a change of $V_P$ by an amount $V_O$ induces a relative TE/TM phase shift of $\pi$. The desired polarization transformation is obtained by adjusting only the endlessly variable phase angles $\gamma$ and $\mu$ in (1). The bias voltage $V_T$ in (1c) allows electrooptic tuning of the wavelength of operation.

Mode conversion is accomplished via the $r_{51}$ electrooptic coefficient ($r_{51} \approx 28 \times 10^{-12}$ m/V) by inducing an electrical field $E_x$ in the waveguide. Here, the TE and TM polarized modes propagate with significantly different phase velocities because of the large birefringence of LiNbO$_3$. Efficient TE$\leftrightarrow$TM is achieved with phase coherent periodic coupling that is generated in the embodiment shown via interdigital finger electrodes (21,21') of mode converter 11 and (23,23') of mode converter 13 having interdigital period $\Lambda_f$ inducing a spatially periodic electrical field $E_x(y) = E_x(y + \Lambda_f)$ in waveguide 20. More efficient mode conversion is achieved at a period $\Lambda$ with $$\Lambda = \lambda_o / |\Delta n_{ph}|, \quad (2)$$

where $\Delta n_{ph} = n_{TM} - n_{TE}$ is the difference of the effective phase indexes of the TM and TE modes, and $\lambda_o$ is the free-space operating wavelength.

TE/TM phase shifting is accomplished via the $r_{13}$ and $r_{33}$ electrooptic coefficients ($r_{13} \approx 10 \times 10^{-12}$ m/V; $r_{33} \approx 30 \times 10^{-12}$ m/V) by inducing a uniform electrical field $E_z$ in the waveguide using standard phase shifter electrodes (22, 22') of phase shifter 12 and (24, 24') of phase shifter 14. Here, a net TE/TM phase shift is obtained because the TE and TM modes see unequal changes in the refractive indexes ($r_{13} \neq r_{33}$).

Figure 3:
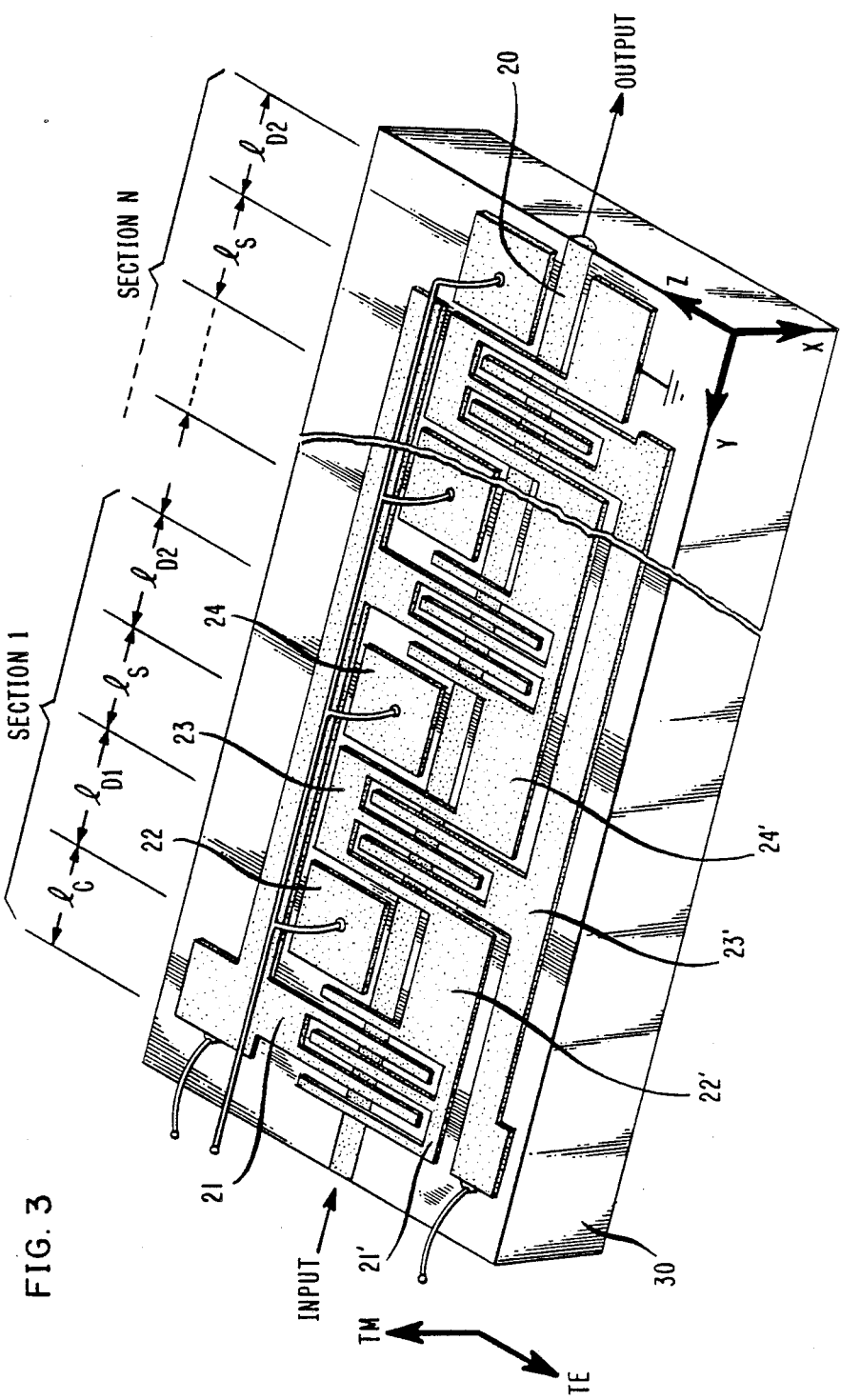
FIG. 3 is a perspective view of an examplary multi-section device in accordance with the principles of the invention.

The interleaved electrode system of FIG. 3 is composed of N identical sections, each section including two short portions of TE$\leftrightarrow$TM mode converter electrodes (21, 21') from mode converter 11 and (23, 23') from mode converter 13 interleaved with two short portions of TE/TM phase shifter electrodes (22, 22') of phase shifter 12 and (24, 24') of phase shifter 14, as shown in the FIGS. In each section, a short portion of mode converter electrodes 21,21' of length $1_C$ precedes a short portion of phase shifter electrodes 22,22' of length $1_{P1}$, which is then followed by a second short portion of mode converter electrodes 23,23' of length $1_S$ and another short portion of phase shifter electrodes 24,24' of length $1_{P2}$.

The total length of each section is chosen to be an integer multiple of the period $\Lambda$, i.e., $1_C + 1_S + 1_{D1} + 1_{D2} = M\Lambda$, where $1_{D1}$ and $1_{D2}$ denote the spaces between the mode converters 11 and 13 (see FIGS. 2 and 3) and M is an arbitrary integer. (Note that these spaces are longer than the actual electrodes for phase shifters 12 and 14, i.e., $1_{D1} > 1_{P1}$ and $1_{D2} > 1_{P2}$). As a result, at $\lambda_0$, optical signals converted by the first mode converters 11 of a multi-section polarization transformer add coherently in phase and, likewise, optical signals converted by the second mode converters 13 of a multi-section polarization transformer. Additionally, $1_{D1}$ and $1_{D2}$ are chosen such that $1_C + 1_{D1} = (2m-1)\Lambda/4$, where m is an integer $1 < m \leq 2M$, As a result of the latter condition, optical signals converted by the second mode converter electrode system differ by $(2m-1) \pi/2$ in optical phase relative to optical signals converted by the first mode converter electrode system.

For $V_P = 0$ (i.e. when only the mode converters are operated), the transformer acts as a TE$\leftrightarrow$TM converter with endlessly variable TE/TM output phase.

For $V_S = 0$ (i.e. when only the first mode converter and the first and second phase shifters are operated), the device acts as a linear phase retarder of adjustable azimuth as in a rotatable wave plate. For $V_C = 0$, i.e. when only the second mode converters and the first and second phase shifters are used, the transformer acts as a linear polarization rotator because the input light experiences an additional TE/TM phase shift of $\pi/2$ in the birefringent waveguide before it enters the linear retarder and an opposite phase shift of $-\pi/2$ after it exits the retarder. (Note that in a birefringent waveguide the state of polarization is only defined locally. Here, we define the input polarization as the state of polarization at the beginning of the first period $\Lambda$ in the first mode converter).

The desired operation as a general polarization controller with infinite transformation range is obtained when drive voltages of the form (Eq. 1a through c) are applied to all three electrode systems. Here, the voltage amplitudes are chosen such that $V'_0$ is the voltage for a relative TE/TM phase shift of $\pi$ and $V_0$ is the voltage for complete mode conversion. Then, the transformer produces general elliptical birefringence of constant total phase retardation $\pi$, similar to a rotatable half-wave plate placed between two adjustable TE/TM phase shifters, where the input light is shifted by $-\mu$ in relative phase before it experiences general linear birefringence of adjustable azimuth $\gamma/2$ and the output light is shifted by $+\mu$ in phase. Here, the azimuth of the half-wave plate and the input and output phase shifts can be varied without any limits, because $\gamma$ and $\mu$ are determined by the ratios of the drive voltages rather than by their amplitudes, i.e., $\tan \gamma = V'_0 \sqrt{(V_C/V_{OC})^2 + (V_S/V_{OS})^2}/(V_P - V_T)$ and $\tan \mu = (V_{OC} V_S)/(V_{OS} V_C)$, thus allowing general polarization transformations with infinite transformation range.

Ideal performance of the transformer is generally obtained with a large number of interleaved mode converter and phase shifter sections in the entire interaction length $L = NM\Lambda$, i.e. $N \gg 1$. The transformer in the exemplary implementation can only be operated within a narrow optical bandwidth because of the large birefringence of LiNbO$_3$ ($\Lambda \approx 21 \mu$m at $\lambda_0 = 1.52 \mu$m). For example, a transformer with a total interaction length of $L = 810\Lambda$ ($L = 1.7$ cm at $\lambda_0 = 1.52 \mu$m) will have a bandwidth of less than $\lambda_0 / 1000$. However, the wavelength of operation can be tuned off the design wavelength $\lambda_0$ by applying a bias voltage $V_T$ to the $P_1$ and $P_2$ phase shifter electrodes. Larger bandwidths and tuning ranges can be achieved by implementing the transformer on LiTaO$_3$, where the crystal birefringence is substantially lower than for LiNbO$_3$.

Each electrode system is described by a corresponding $2 \times 2$ transfer matrix and then the overall transfer matrix is calculated as the product of all individual transfer matrices. For $N \gg 1$, the overall transfer matrix can be approximated by simple analytic functions.

In the following, it is assumed that the waveguide is lossless and that it supports only the fundamental TE$_0$ and TM$_0$ modes. For simplicity, it is further assumed that $\lambda_f = \lambda$ and that $1_S = 1_C$ such that $V_{OC} = V_{OS} = V_O$. By neglecting the lateral mode distributions as well as the common time dependence $\exp(-j\omega t)$, it is possible to characterize the amplitudes of the two modes by $A_i(y) = a_i(y) \exp(j\beta_i y)$, $i = 1,2$, where $\lambda_1(\lambda) = n_{TE}(\lambda) 2\pi/\lambda$ and $\beta_2(\lambda) = n_{TM}(\lambda) 2\pi/\lambda$ denote the propagation constants of the two modes. A general state of polarization in the waveguide is then represented by a normalized column vector $\vec{A}(y)$ with elements $A_1(y)$ and $A_2(y)$, $$\vec{A}(y) = \begin{pmatrix} A_1(y) \\ A_2(y) \end{pmatrix} = \begin{pmatrix} \cos\theta\, e^{-j\phi/2} \\ \sin\theta\, e^{j\phi/2} \end{pmatrix} e^{j(\beta_1 y + \Phi)}, \tag{3}$$

where $\theta$ is the polarization angle and $\phi$ is the relative TE/TM phase angle, with $0 \leq \theta \leq \pi/2$ and $0 \leq \phi \leq 2\pi$.

The output polarization $\vec{A}(L)$ of the transformer can then be related to the input polarization $\vec{A}(0)$ by a $2 \times 2$ Jones matrix $\underline{T}$ as $\vec{A}(L) = \underline{T}\vec{A}(0)$. Using similar relations for the individual mode converters and phase shifters, a first mode converter is represented by a matrix $\underline{C}$, a second mode converter is represented by a matrix $\underline{S}$, a first phase shifter is represented by a matrix $\underline{P_1}$ and a second phase shifter is represented by a matrix $\underline{P_2}$. The overall transfer matrix $\underline{T_N}$ of a transformer consisting of N identical sections is then given by $$T_N = [\underline{P_2} \cdot \underline{S} \cdot \underline{P_1} \cdot \underline{C}]^N, \tag{4}$$

where $\underline{T_1}$ is the transfer matrix of a single section of length $M\Lambda$.

It is then found that for $\underline{C}$ and $\underline{S}$ at wavelengths close to $\lambda_0$ $$\underline{C}, \underline{S} = \begin{pmatrix} a_{C,S}\, e^{j\zeta} & -jb_{C,S}\, e^{j\zeta} \\ -jb_{C,S}\, e^{-j\zeta} & a_{C,S}^*\, e^{-j\zeta} \end{pmatrix} e^{-j\xi}, \tag{5a}$$

where the asterisk denotes the complex conjugate, $\zeta = \pi l_C/\Lambda$, and $\xi = (\beta_2 + \beta_1)l_C/2$. The functions $a_i$ and $b_i$, $i = C, S$, are given by $$a_i = \cos(\sqrt{\kappa_i^2 + \delta^2}\, l_C) + j\delta \frac{\sin(\sqrt{\kappa_i^2 + \delta^2}\, l_C)}{\sqrt{\kappa_i^2 + \delta^2}}, \tag{5b}$$

$$b_i = \kappa_i \frac{\sin(\sqrt{\kappa_i^2 + \delta^2}\, l_C)}{\sqrt{\kappa_i^2 + \delta^2}}, \tag{5c}$$

where $\kappa_C = \kappa_0 \sin\gamma \cos\mu$ and $\kappa_S = \kappa_0 \sin\gamma \sin\mu$ are the coupling coefficients per unit length for first mode converter 11 and second mode converter 13 with $$\kappa_0 = \Gamma_{TE-TM} \frac{4\pi}{\lambda_0} \sqrt{n_{TE}^3\, n_{TM}^3}\, r_{51} \frac{V_0}{\Lambda}, \tag{6}$$

and $\delta$ describes the phase mismatch per unit length in the coupling process when the device is operated at a wavelength $\lambda_0 + \Delta\lambda$ $$\delta = \frac{\beta_2 - \beta_1}{2} - \frac{\pi}{\Lambda} \approx -\frac{\Delta\lambda}{\lambda_0} \frac{\pi}{\Lambda} \frac{\Delta n_{gr}(\lambda_0)}{\Delta n_{ph}(\lambda_0)}. \tag{7}$$

As shown above, $\Delta n_{ph}(\lambda)$ denotes the wavelength dependent phase index difference of the two modes and $$-\lambda_0 \left[\frac{d}{d\lambda} \Delta n_{ph}(\lambda)\right] \tag{8}$$

$$\Delta n_{gr}(\lambda_0) = \Delta n_{ph}(\lambda_0) - \lambda_0 \left[\frac{d}{d\lambda} \Delta n_{ph}(\lambda)\right]_{\lambda = \lambda_0}$$

is the group index difference at $\lambda_0$. In Equation 6, $\Gamma_{TE-TM}$ is a normalized parameter that characterizes the overlap of the applied electrical field with the two optical fields, $0 \leq \Gamma_{TE-TM} \leq 1$.

Figure 2:
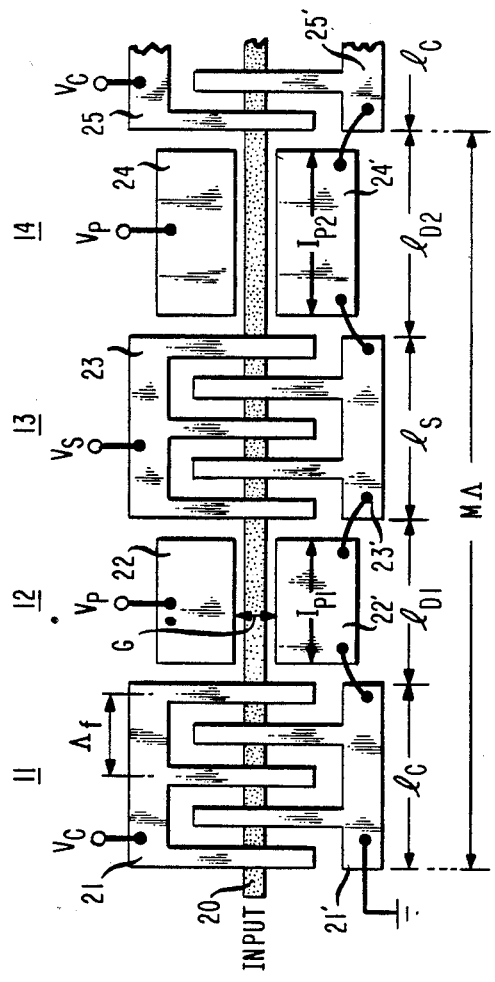
FIG. 2 is a top view of the waveguide and electrode structure for an exemplary embodiment of the invention.

It is found that, for the transfer matrix of a single first phase shifter, $$\underline{P_1} = \begin{pmatrix} \exp[-j(\beta_1 l_{D1} + \Delta\beta_1 l_{P1})] & 0 \\ 0 & \exp[-j(\beta_2 l_{D1} + \Delta\beta_2 l_{P1})] \end{pmatrix}, \tag{9a}$$

from which $\underline{P_2}$ is obtained by replacing $l_{D1}$ and $l_{P1}$ by $l_{D2}$ and $l_{P2}$, respectively. By assuming mode 1 to be the TE mode and mode 2 the TM mode, it is found that the electrooptically induced phase shifts per unit length are given by:

$$\Delta\beta_1 = \Gamma_{TE} \frac{\pi}{\lambda_0} n_{TE}^3\, r_{33} \frac{V_P}{G}, \tag{9b}$$

$$\Delta\beta_2 = \Gamma_{TM} \frac{\pi}{\lambda_0} n_{TM}^3\, r_{13} \frac{V_P}{G}, \tag{9c}$$

where $\Gamma_{TE}$ and $\Gamma_{TM}$ are normalized overlap parameters of the applied electrical field with the optical fields of the TE and TM modes and G is the electrode gap between the phase shifter electrodes (FIG. 2). In each phase shifter $O_1$ or $P_2$, a relative TE/TM phase shift of $\Delta\phi_1 = (\Delta\beta_2 - \Delta\beta_1)l_{P1}$ or $\Delta\phi_2 = (\Delta\beta_2 - \Delta\beta_1)l_{P2}$, respectively, is induced because of different electrooptic coefficients $r_{33} \approx 3r_{13}$.

By substitution of (5)–(9) into (4), it is possible to calculate $\underline{T_1}$ and from that $\underline{T_N}$ as the Nth power of $\underline{T_1}$. It can be shown that, in general, the exact analytic expressions for $\underline{T_N}$ are complicated functions of $\kappa_C$, $\kappa_S$, $\Delta\phi_1$, $\Delta\phi_2$, and $\delta$. However, for $N > 1$ and for wavelengths close to $\lambda_0$ we can approximate $T_N$ by simple analytical functions. Each mode converter and phase shifter provides only a small amount of mode conversion and phase shifting, i.e., $|\kappa_0 l_C| < 1$, $|\Delta\phi_1| < 1$, $|\Delta\phi_2| < 1$, and $|\delta M\Lambda| < 1$. Thus, the matrix elements of (5) and (9) can be approximated by series expansions in powers of $\kappa_0$, $\Delta\phi_1$, $\Delta\phi_2$, and $\delta$, neglecting terms of third and higher orders. In this approximation $\underline{T_N}$ is given by $$\underline{T_N} \approx \underline{T_\infty} = \begin{pmatrix} \cos\Psi + j\bar{\delta}L \frac{\sin\Psi}{\Psi} & -j\bar{\kappa}L \frac{\sin\Psi}{\Psi} e^{j\mu} \\ -j\bar{\kappa}L \frac{\sin\Psi}{\Psi} e^{-j\mu} & \cos\Psi - j\bar{\delta}L \frac{\sin\Psi}{\Psi} \end{pmatrix} e^{-j\Theta} \tag{1}$$

where $\Psi = \sqrt{\bar{\kappa}^2 + \bar{\delta}^2}\, L$ and $\Theta = (\beta_1 + \bar{\delta})L$. It has been assumed that M is odd, $\bar{\kappa} = \sqrt{\kappa_C^2 + \kappa_S^2}\, \rho_C$ is the averaged coupling coefficient per unit length with $\rho_C = l_C/M\Lambda$, and $\bar{\delta} = \delta + (\Delta\beta_1 - \Delta\beta_2)\rho_P/2$ characterizes the averaged phase mismatch per unit length with $\rho_P = (l_{P1} + l_{P2})/M\Lambda$.

Equation (10) describes the transfer function of a general polarization compensator providing variable elliptical birefringence. Here, $2\bar{\delta}L$ characterizes the amount of TE/TM phase shifting, $\bar{\kappa}L\cos\mu$ the amount of TE$\leftrightarrow$TM conversion, $\bar{\kappa}$L sin $\mu$ the amount of circular phase retardation, and the total amount of elliptical phase retardation is given by $2\Psi$.

It is expected that the transfer matrix $\underline{T}_N$ of a practical device with a finite number of mode converter-/phase shifter sections deviates from the ideal analysis in Equation 10. The magnitudes of the deviations are on the order of 1/N and can be kept small by using a large number of sections. For example, a transformer with a total number of N=30 sections, which can easily be realized on a 2-cm-long LiNbO$_3$ crystal (assuming M=31, $\Lambda$=21 $\mu$m), will show phase deviations of less than 0.04 rad and amplitude deviations of less than $-30$ dB from the ideal form.

By using Equation 10, it is easy to verify that the transformer allows general polarization transformations from any arbitrary input to any arbitrary output polarization. Here, it can be shown that even for constant phase retardation $2\Psi=\pi$ and with only two independently adjustable parameters, $\bar{\delta}/\bar{\kappa}$ and $\mu$, the transformer is capable of providing general polarization transformations from any given input to any prescribed output polarization, where the transformation range is effectively unlimited.

For general polarization transformations bias voltage $V_T$ in (1) is adjusted to induce a constant electrooptic phase shift of $-2\delta L$ for compensating undesired phase mismatch $\delta$ that occurs when the the transformer is operated at a wavelength different from $\lambda_0$. Voltage amplitudes $V_0$ and $V'_0$ in (1) are adjusted such that:

$$(\Gamma_{TM}n_{TM}^3 r_{13} - \Gamma_{TE}n_{TE}^3 r_{33})\frac{\pi}{2\lambda_0} \frac{V_0}{G} \rho_P L = \kappa_0 \rho_C L = \Psi. \quad (11)$$

Then $\Psi$ is independent of $\gamma$, i.e. constant, and $\bar{\kappa}L = \Psi \sin\gamma$ as well as $\bar{\delta}L = \Psi \cos\gamma$ so that Equation 10 can be rewritten as $$T_\infty(\Psi,\gamma,\mu) = \begin{pmatrix} \cos\Psi + j\cos\gamma\sin\Psi & -j\sin\gamma\sin\Psi e^{j\mu} \\ -j\sin\gamma\sin\Psi e^{-j\mu} & \cos\Psi - j\cos\gamma\sin\Psi \end{pmatrix}, \quad (12)$$

where the common phase factor exp $[-j\Theta]$ has been suppressed. Here, $\underline{T}_\infty(\Psi, 0, 0)$ describes pure TE/TM phase shifting, $\underline{T}_\infty(\Psi, \pi/2, 0)$ pure TE$\leftrightarrow$TM conversion, and $\underline{T}_\infty(\Psi, \pi/2, \pi/2)$ pure circular phase retardation. Equation (12) can be decomposed into a product of three matrices describing linear phase retardation ($\mu=0$), $$\underline{T}_\infty(\Psi,\gamma,\mu) = \underline{T}_\infty(\mu/2,0,0) \cdot \underline{T}_\infty(\Psi,\gamma,0) \cdot \underline{T}_\infty(-\mu/2,0,0-), \quad (13)$$

thus verifying that the transformer acts similar to an endlessly rotatable wave plate placed between two endlessly adjustable TE/TM phase shifters of opposite phase shifts.

From (13), it is also found that for constant total phase retardation $2\Psi=\pi$ and with only $\gamma$ and $\mu$ adjustable in the ranges $0 \leq \gamma \leq \pi$ and $-\pi/2 \leq \mu \leq \pi/2$ (or $-\pi/2 \leq \gamma \leq \pi/2$ and $-\pi \leq \mu \leq \pi$) the polarization transformer produces general elliptical birefringence ($\mu \neq 0$) that allows general polarization transformations from any given input to any desired output state. This is verified by applying $T_\infty(\pi/2, \gamma, \mu)$ to an input polarization of arbitrary polarization angle $\theta_{in}$ and phase angle $\phi_{in}$, which yields for the polarization and phase angle of the output polarization $$\cos 2\theta_{out} = \cos 2\gamma \cos 2\theta_{in} - \sin 2\gamma \sin 2\theta_{in} \cos(\phi_{in} + \mu), \quad (14a)$$

$$\tan \phi_{out} = \frac{d_1 \cos\mu - d_2 \sin\mu}{d_1 \sin\mu + d_2 \cos\mu}, \quad (14b)$$

where $d_1 = \sin 2\theta_{in}\sin(\phi_{in}+\mu)$ and $d_2 = \cos 2\theta_{in}\sin 2\gamma + \sin 2\theta_{in}\cos 2\gamma\cos(\phi_{in}+\mu)$. With (14), it is shown that for any given input polarization ($\theta_{in}, \phi_{in}$) there exists at least one transformation $\underline{T}_\infty(\pi/2, \gamma, \mu)$ to the desired output polarization ($\theta_{out}, \phi_{out}$). By substitution, it can be verified that the desired transformation is obtained when the following conditions are satisfied $$\tan \gamma = \frac{V_0 \sqrt{V_C^2 + V_S^2}}{V_0(V_P - V_T)} = \quad (15a)$$

$$-\frac{\sqrt{\sin^2 2\theta_{out} + \sin^2 2\theta_{in} - 2\sin 2\theta_{out}\sin 2\theta_{in}\cos(\phi_{out} - \phi_{in})}}{\cos 2\theta_{out} + \cos 2\theta_{in}}$$

$$\tan \mu = \frac{V_S}{V_C} = \frac{-\sin 2\theta_{out}\sin\phi_{out} - \sin 2\theta_{in}\sin\phi_{in}}{\sin 2\theta_{out}\cos\phi_{out} + \sin 2\theta_{in}\cos\phi_{in}}, \quad (15b)$$

where $0 \leq \gamma \leq \pi$ and $0 \leq \mu \leq 2\pi$. For TE (or TM) polarized input light with $\theta_{in} = 0$ ($\theta_{in} = \pi/2$) and $\phi_{in}$ arbitrary, equations (15) simplify to $\tan\gamma = \tan\theta_{out}$ ($\tan\gamma = \tan(-\theta_{out}+\pi/2)$) and $\tan\mu = \tan\phi_{out}$.

By a somewhat lengthy analysis of (15), one can show that the transformer 10 provides an effectively infinite range of polarization transformations even though the drive voltages are bounded to the ranges $-V_O \leq V_C$, $V_S \leq V_O$ and $-V'_O \leq V_P - V_T \leq V_O$. However, a more pictorial understanding of the operation of the transformer can be gained by representing the transformations (12) on the Poincaré sphere. In this representation, each state of polarization corresponds to a point on a 3-dimensional sphere of unit radius, where the point of representation (or the vector to this point) is uniquely determined by the polarization angle $\theta$ and the phase angle $\phi$. The TE and TM polarized modes are represented by the north and south poles of the sphere, respectively, and the circular polarizations correspond to the two intersections of the equator with the Y-axis of the representation space. The two intersections of the equator with the X-axis represent the two linear polarized modes under $+45°$ and $-45°$, respectively.

The transformations described by (12) correspond on the Poincaré sphere to rotations of the representation vector through an angle $2\Psi$. Here, a rotation about the X-axis corresponds to pure TE$\leftrightarrow$TM conversion, a rotation about the Y-axis to pure circular birefringence, and a rotation about the Z-axis to pure TE/TM phase shifting. It can be shown that for a general transformation $\underline{T}_\infty(\Psi,\gamma,\mu)$ the (normalized) axis of rotation is given by $$\vec{\Omega} = \begin{pmatrix} +\sin\gamma\cos\mu \\ -\sin\gamma\sin\mu \\ -\cos\gamma \end{pmatrix} + \begin{pmatrix} +V_C/V_0 \\ -V_S/V_0 \\ -(V_P - V_T)/V_0 \end{pmatrix}. \quad (16)$$

It is noted that $\vec{\Omega}$ can assume any arbitrary orientation in the representation space and that its coordinates are directly proportional to the drive voltages $V_C$, $V_S$, and $V_P-V_T$. Thus, with the drive voltages in the ranges $-V_O \leq V_C, V_S \leq V_O$ and $-V'_O \leq (V_P-V_T) \leq V'_O$ we can rotate $\overline{\Omega}$ arbitrarily in the representation space.

On the Poincare' sphere, the transformation (15) is achieved by orienting $\overline{\Omega}$ such that it bisects the angle between the representation vectors of the input and output polarizations. Rotation of the input polarization vector through an angle $2\Psi = \pi$ about $\overline{\Omega}$ then yields the desired output polarization. It is easily seen that this transformation algorithm allows continuous transformations from any arbitrarily varying input into any arbitrary output polarization because $\overline{\Omega}$ is endlessly rotatable in the representation space.

The transformer can endlessly repeat any arbitrary transformation sequence without requiring a reset cycle. Moreover, since $\overline{\Omega}$ is freely rotatable it follows that endless polarization control is even possible when the input and output polarizations vary simultaneously. Finally, it should be noted that the transformer controls only the relative TE/TM output phase but not the absolute output phase. Moreover, an undesired common phase change of $(\overline{\delta} + \Delta\beta_1 \rho_P)L$ occurs in the output light when a voltage $V_P$ is applied to the first and second phase shifters, as seen in (10).

Fabrication techniques for the device are well known to those of ordinary skill in the art. Fabrication techniques described in U.S. Pat. Nos. 4,533,207 and 4,384,760 are expressly incorporated herein by reference.

The examples shown in the FIGs. and described above rely on cascadable polarization transformer sections in which the elements are arranged as follows: a first TE$\longleftrightarrow$TM mode converter 11, a first TE/TM phase shifter 12, a second TE$\longleftrightarrow$TM mode converter 13, and a second TE/TM phase shifter 14. It is also contemplated that either first phase shifter 12 or second phase shifter 14 may be omitted from one or more polarization transformer sections without impairing performance of the device. Moreover, it is contemplated that, for an N-section transformer, the cascaded sections need not be identical. That is, some sections may include the elements shown in FIG. 1 whereas other sections may have a phase shifter section omitted.

For the mode converter, it is understood by those skilled in the art that interdigitated electrode structure may be replaced by an alternating pad structure similar to that shown in O. Eknoyan et al., *Applied Optics*, Vol. 27, pp. 114–117, 1988.

I claim:

1. A polarization transformer for controlling polarization and phase of optical signals propagating in a birefringent waveguide at a desired wavelength of operation, said polarization transformer comprising at least one section including in cascade:
    a first mode converter for changing amplitudes of orthogonally polarized components of the optical signals relative to each other;
    a first phase shifter for changing phases of said orthogonally polarized components of the optical signals relative to each other;
    a second mode converter for changing amplitudes of orthogonally polarized components of the optical signals relative to each other;
    a second phase shifter for changing phases of said orthogonally polarized components of the optical signals relative to each other;
    said section having a length M·$\lambda$ and said second mode converter being located substantially at a distance $(2m-1)\lambda/4$ from the beginning of said first mode converter, wherein m and M are positive integers and $1 \leq m \leq 2M$ and $\lambda$ is a beat length of said orthogonally polarized components of the optical signals in said waveguide at the desired wavelength of operation.

2. The polarization transformer defined in claim 1 wherein, said section has a ratio of lengths between said first and second phase shifters being substantially equal to $(2m-1)/(4M-2m+1)$.

3. The polarization transformer defined in claim 1 or 2 wherein said first mode converter is substantially identical to said second mode converter.

4. A polarization transformer for controlling polarization and phase of optical signals propagating in a birefringent waveguide at a desired wavelength of operation, said polarization transformer comprising N sections, for N being an integer greater than 1, each section including in cascade:
    a first mode converter for changing amplitudes of orthogonally polarized components of the optical signals relative to each other;
    a first phase shifter for changing phases of said orthogonally polarized components of the optical signals relative to each other;
    a second mode converter for changing amplitudes of orthogonally polarized components of the optical signals relative to each other;
    a second phase shifter for changing phases of said orthogonally polarized components of the optical signals relative to each other;
    each said section having a length M·$\lambda$ and said second mode converter being located substantially at a distance $(2m-1)\lambda/4$ from the beginning of said first mode converter, wherein m and M are positive integers and $1 \leq m \leq 2M$ and $\lambda$ is a beat length of said orthogonally polarized components of the optical signals in said waveguide at the desired wavelength of operation.

5. The polarization transformer defined in claim 4 wherein each said section has a ratio of lengths between said first and second phase shifters being substantially equal to $(2m-1)/(4M-2m+1)$.

6. The polarization transformer defined in claim 4 or 5 wherein said first mode converter is substantially identical to said second mode converter.

7. A polarization transformer for controlling polarization and phase of optical signals propagating in a birefringent waveguide at a desired wavelength of operation, said polarization transformer comprising at least one section including in cascade:
    a first mode converter for changing amplitudes of orthogonally polarized components of the optical signals relative to each other;
    a first phase shifter for changing phases of said orthogonally polarized components of the optical signals relative to each other;
    a second mode converter for changing amplitudes of orthogonally polarized components of the optical signals relative to each other;
    said section having a length M·$\lambda$ and said second mode converter being located substantially at a distance $(2m-1)\lambda/4$ from the beginning of said first mode converter, wherein m and M are positive integers and $1 \leq m \leq 2M$ and $\lambda$ is a beat length of said orthogonally polarized components of the optical signals in said waveguide at the desired wavelength of operation.

8. The polarization transformer defined in claim 7 wherein said first mode converter is substantially identical to said second mode converter.

9. A polarization transformer for controlling polarization and phase of optical signals propagating in a birefringent waveguide at a desired wavelength of operation, said polarization transformer comprising N sections, for N being an integer greater than 1, each section including in cascade:
- a first mode converter for changing amplitudes of orthogonally polarized components of the optical signals relative to each other;
- a first phase shifter for changing phases of said orthogonally polarized components of the optical signals relative to each other;
- a second mode converter for changing amplitudes of orthogonally polarized components of the optical signals relative to each other;
- each said section having a length $M \cdot \Lambda$ and said second mode converter being located substantially at a distance $(2m-1)\Lambda/4$ from the beginning of said first mode converter, wherein m and M are positive integers and $1 \leq m \leq 2M$ and $\Lambda$ is a beat length of said orthogonally polarized components of the optical signals in said waveguide at the desired wavelength of operation.

10. The polarization transformer defined in claim 9 wherein said first mode converter is substantially identical to said second mode converter.

11. A polarization transformer for controlling polarization and phase of optical signals propagating in a birefringent waveguide at a desired wavelength of operation, said polarization transformer comprising at least one section including in cascade:
- a first mode converter for changing amplitudes of orthogonally polarized components of the optical signals relative to each other;
- a second mode converter for changing amplitudes of orthogonally polarized components of the optical signals relative to each other;
- a first phase shifter for changing phases of said orthogonally polarized components of the optical signals relative to each other;
- said section having a length $M \cdot \Lambda$ and said second mode converter being located substantially at a distance $(2m-1)\Lambda/4$ from the beginning of said first mode converter, wherein m and M are positive integers and $1 \leq m \leq 2M$ and $\Lambda$ is a beat length of said orthogonally polarized components of the optical signals in said waveguide at the desired wavelength of operation.

12. The polarization transformer defined in claim 11 wherein said first mode converter is substantially identical to said second mode converter.

13. A polarization transformer for controlling polarization and phase of optical signals propagating in a birefringent waveguide at a desired wavelength of operation, said polarization transformer comprising N sections, for N being an integer greater than 1, each section including in cascade:
- a first mode converter for changing amplitudes of orthogonally polarized components of the optical signals relative to each other;
- a second mode converter for changing amplitudes of orthogonally polarized components of the optical signals relative to each other;
- a first phase shifter for changing phases of said orthogonally polarized components of the optical signals relative to each other;
- each said section having a length $M \cdot \Lambda$ and said second mode converter being located substantially at a distance $(2m-1)\Lambda/4$ from the beginning of said first mode converter, wherein m and M are positive integers and $1 \leq m \leq 2M$ and $\Lambda$ is a beat length of said orthogonally polarized components of the optical signals in said waveguide at the desired wavelength of operation.

14. The polarization transformer defined in claim 13 wherein said first mode converter is substantially identical to said second mode converter.

15. A polarization transformer for controlling polarization and phase of optical signals propagating in a birefringent waveguide at a desired wavelength of operation, said polarization transformer comprising at least one section, said at least one section having a length $M \cdot \Lambda$ and including in cascade:
- a first mode converter for changing amplitudes of orthogonally polarized components of the optical signals relative to each other;
- a first phase shifter for changing phases of said orthogonally polarized components of the optical signals relative to each other;
- a second mode converter for changing amplitudes of orthogonally polarized components of the optical signals relative to each other, said second mode converter being located substantially at a distance $(2m-1)\Lambda/4$ from the beginning of said first mode converter, wherein m and M are positive integers and $1 \leq m \leq 2M-1$ and $\Lambda$ is a beat length of said orthogonally polarized components of the optical signals in said waveguide at the desired wavelength of operation;
- a second phase shifter for changing phases of said orthogonally polarized components of the optical signals relative to each other;
- a third mode converter for changing amplitudes of orthogonally polarized components of the optical signals relative to each other, said third mode converter being located substantially at a distance $(2j-1)\Lambda/2$ from the beginning of said first mode converter, wherein j is a positive integer and $m/2 < j \leq M$;
- a third phase shifter for changing phases of said orthogonally polarized components of the optical signals relative to each other;
- a fourth mode converter for changing amplitudes of orthogonally polarized components of the optical signals relative to each other, said fourth mode converter being located substantially at a distance $(4j+2k-3)\Lambda/4$ from the beginning of said first mode converter, wherein k is a positive integer and $1 \leq k \leq 2(M-j)$;
- a fourth phase shifter for changing phases of said orthogonally polarized components of the optical signals relative to each other.

16. The polarization transformer defined in claim 15 wherein said third mode converter includes an electrode structure for adding optical signals converted by said third mode converter coherently in phase with optical signals converted by said first mode converter, and wherein said fourth mode converter includes an electrode structure for adding optical signals converted by said fourth mode converter coherently in phase with optical signals converted by second mode converter.

17. The polarization transformer defined in claim 15 wherein said first, second, third and fourth mode converters are substantially identical.

18. A polarization transformer for controlling polarization and phase of optical signals propagating in a birefringent waveguide at a desired wavelength of operation, said polarization transformer comprising N sections, for N being an integer greater than 1, each section having a length $M \cdot \Lambda$ and including in cascade:

- a first mode converter for changing amplitudes of orthogonally polarized components of the optical signals relative to each other;
- a first phase shifter for changing phases of said orthogonally polarized components of the optical signals relative to each other;
- a second mode converter for changing amplitudes of orthogonally polarized components of the optical signals relative to each other, said second mode converter being located substantially at a distance $(2m-1)\Lambda/4$ positive integers and $1 \leq m \leq 2M-1$ and $\Lambda$ is a beat length of said orthogonally polarized components of the optical signals in said waveguide at the desired wavelength of operation;
- a second phase shifter for changing phases of said orthogonally polarized components of the optical signals relative to each other;
- a third mode converter for changing amplitudes of orthogonally polarized components of the optical signals relative to each other, said third mode converter being located substantially at a distance $(2j-1)\Lambda/2$ from the beginning of said first mode converter, wherein j is a positive integer and $m/2 < j \leq M$;
- a third phase shifter for changing phases of said orthogonally polarized components of the optical signals relative to each other;
- a fourth mode converter for changing amplitudes of orthogonally polarized components of the optical signals relative to each other, said fourth mode converter being located substantially at a distance $(4+2k-3)\Lambda/4$ from the beginning of said first mode converter, wherein k is a positive integer and $1 \leq \overline{k} \leq 2(M-j)$;
- a fourth phase shifter for changing phases of said orthogonally polarized components of the optical signals relative to each other.

19. The polarization transformer defined in claim 18 wherein for each section said third mode converter includes an electrode structure for adding optical signals converted by said third mode converter coherently in phase with optical signals converted by said first mode converter, and wherein for each section said fourth mode converter includes an electrode structure for adding optical signals converted by said fourth mode converter coherently in phase with optical signals converted by said second mode converter.

20. The polarization transformer defined in claim 18 wherein said first, second, third and fourth mode converters are substantially identical within each section.

* * * * *